United States Patent [19]

Mok

[11] Patent Number: 5,440,571
[45] Date of Patent: Aug. 8, 1995

[54] CIRCUIT OF ADDRESSING A MEMORY BUFFER FOR ERROR CORRECTION IN A DIGITAL AUDIO TAPE RECORDER

[75] Inventor: Cheol-Woong Mok, Incheon, Rep. of Korea

[73] Assignee: Samsung Electronics Co., Ltd., Kyungki, Rep. of Korea

[21] Appl. No.: 977,830

[22] Filed: Nov. 17, 1992

[30] Foreign Application Priority Data

Nov. 22, 1991 [KR] Rep. of Korea ............... 20935/1991

[51] Int. Cl.[6] ............................................. H03M 13/00
[52] U.S. Cl. ........................................ 371/40.1; 367/13
[58] Field of Search ................... 371/40.1, 40.2, 40.3, 371/40.4; 369/13; 360/32, 38.1, 47

[56] References Cited

U.S. PATENT DOCUMENTS

| | | | |
|---|---|---|---|
| 4,805,173 | 2/1989 | Hillis et al. | 371/38 |
| 4,873,588 | 10/1989 | Hiramatsu | 360/47 |
| 4,890,286 | 12/1989 | Hirose | 371/37.1 |
| 4,914,460 | 4/1990 | Hirose | 371/37.1 |
| 5,163,136 | 11/1992 | Richmond | 395/275 |
| 5,253,126 | 10/1993 | Richmond | 360/53 |
| 5,287,478 | 2/1994 | Johnston et al. | 395/425 |
| 5,293,361 | 3/1994 | Aizawa | 369/13 |

*Primary Examiner*—Roy N. Envall, Jr.
*Assistant Examiner*—Emmanuel Moise
*Attorney, Agent, or Firm*—Sughrue, Mion, Zinn, Macpeak & Seas

[57] ABSTRACT

An addressing circuit for controlling an address in order to correct an error in case of recording digital data transmitted from a computer on the basis of a DDS (Digital Data Stage) format in a digital audio tape. The addressing circuit has a buffer memory connected to receive digital data transmitted from a host computer, for storing and accessing the digital data supplied by a given control signal, a control signal generating circuit connected to receive a start instruction and a start address from the exterior, for generating a control signal of the buffer memory, and a C3 encoding circuit connected to receive the control signal of the control signal generating circuit, for generating a parity of two symbols with respect to 44 data symbols on the basis of a DDS format.

10 Claims, 7 Drawing Sheets

| | | CHANNEL A | | | CHANNEL B | | |
|---|---|---|---|---|---|---|---|
| WORD NO. | AZIMUTH | 12345678 LSB · MSB | 1111111 90123456 LSB · MSB | 12345678 LSB · MSB | 1111111 90123456 LSB · MSB | AZIMUTH | |
| 0 | + | DFID \| TBD 3027 | LF–ID | DFID \| TBD 3027 | LF–ID | − | ← HEADER |
| 1 | − | LSB   MSB D0 | LSB   MSB D1 | LSB   MSB D2 | LSB   MSB D3 | + | |
| 2 | + | U | S | E | R | − | |
| 3 | − | | | | | + | |
| ⋮ | | D | A | T | A | | |
| 1437 | − | A | R | E | A | + | |
| 1438 | + | | | | | − | |
| 1439 | − | LSB   MSB D5752 | LSB   MSB D5753 | LSB   MSB D5754 | LSB   MSB D5755 | + | |
| 1440 | + | "0" | "0" | "0" | "0" | − | |
| 1455 | − | | | | | + | |

*FIG. 2*

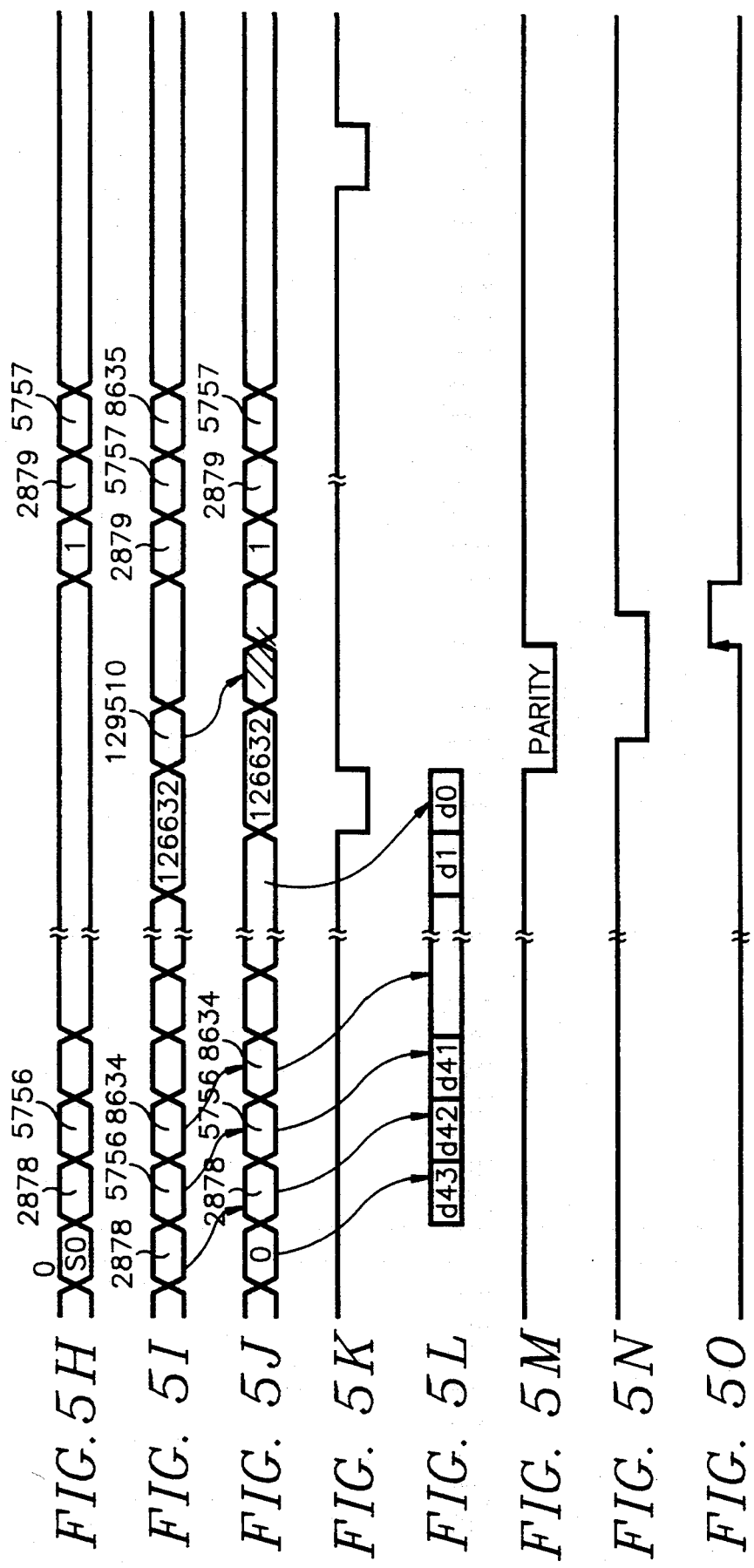

CIRCUIT OF ADDRESSING A MEMORY BUFFER FOR ERROR CORRECTION IN A DIGITAL AUDIO TAPE RECORDER

BACKGROUND OF THE INVENTION

The present invention relates to a digital audio tape recorder (DAT), and more particularly to an addressing circuit for controlling an addressing function in order to correct an error in case of recording digital data transmitted from a host computer on the basis of a digital data storage (DDS) format.

In a conventional DAT for recording and reproducing audio signals, there is specified a double R-S code (Reed-Solomon code) of C1 and C2. Moreover, since the DDS format for processing digital data by use of the DAT specifies a C3 ECC (Error Correction Code) for improving the reliability of data as well as the C1 and C2 codes, a parity besides data is additionally recorded. The C3 encoding generally represented by C3 generates a parity of two symbols (in this case, one symbol corresponds to 8 bits) with respect to input data d(x) of 44 symbols, and in the same way with the C1 and C2 codes of the DAT, operations are performed by Galois field. The field means a range or a set of elements for implementing a specific operation. For example, a real number is a field of the four arithmetical operations. Similarly, operations in R-S code are performed within Galois field. The Galois field is expressed by $GF(\alpha^m)$ or $GF(2^m)$, and consists of the total number $2^m$ of elements. In the case of the DAT, the Galois field of $GF(2^8)$ is used and all the operations are performed with $2^8=256$ elements.

An expression representing the correlationship between elements constituting the Galois field is called a primitive polynomial, and if a predetermined primitive polynomial G(X) is determined, the correlationship between all the elements in the Galois field is determined. In the DAT, the primitive polynomial G(X) is represented by $G(X)=X^8+X^4+X^3+X^2+1$, and it is assumed that a root of G(X)=0 is $\alpha$. Therefore, the number of elements in $GF(2^8)$ is 256 of $\{0, \alpha^0, \ldots, \alpha^{254}\}$. At this time, $\alpha^0=(0000\ 0001)$ and $\alpha^{255}$ is equal to $\alpha^0$. The operation within the Galois field means the operation between symbols, and the result values of all the operations are elements within the field.

Meanwhile, an encoder is an operating circuit for receiving source data d(X) and generating a code word of a regulated form. The code word has k source data symbols and (n-k) parity symbols among a total of n symbols. The source data d(X) is data of the unit of k symbols supplied to the encoder from a signal source, and if the source data d(X) is determined, the parity is generated by a generator polynomial. In the case of C3 of the DDS format, since n=46 and k=44, two parities are produced and the generator polynomial g(X) is as follows:

$$g(X) = \sum_{i=0}^{n-k-1} 1 = \pi_{i=0}^{1}(X+\alpha^i) = X^2 + \alpha^{25} \cdot \alpha^1$$

The generator polynomial g(X) is an important expression for generating the parity in an encoding process, and a key for correcting an error as well as checking whether an error is generated in received data in a decoding process.

In the DDS format, the recorded and reproduced data is processed by the unit of a group. As shown in FIG. 1, one group consists of 22 frames and a 23rd frame is an ECC frame for recording a parity with respect to the 22 frames. One frame of a DAT has two tracks of positive (+) and negative (−) azimuths, and the data allocation of a main region in one frame is shown in FIG.2.

In the case of the DAT, there is data of 5760 bytes while a drum is rotating once, i.e., during 30 msec, and a sampling frequency thereof is 48 KHz. As shown in FIG.2, the total number of data produced in one frame of the tape is 5824 bytes (1456 words). Moreover, a word number 0 is called a header and the ECC processing for the header is not performed. In addition, 64 bytes (word numbers 1440 to 1455) obtained by subtracting 5760 bytes generated during one rotation of a drum from 5824 bytes of the total number of data in one frame are filled with "0's". On the other hand, C3 (46,44) performs encoding with respect to 5756 bytes except for the header among 5760 bytes generated during each 30 msec period. Through the ECC process, even if there is an error in one frame among 22 frames in one group when reproducing data, it is possible to correct the error. That is, if an error occurs in one symbol out of 44 symbols of the source data d(X), the error can be detected and corrected. However, if there are two errors or more, the correction of the errors is difficult.

SUMMARY OF THE INVENTION

Accordingly, it is an object of the present invention to provide an addressing circuit for controlling an addressing function of a buffer memory in order to correct an error when recording digital data on the basis of a DDS format in a DAT.

In accordance with one aspect of the present invention, an addressing circuit has a buffer memory connected to receive digital data transmitted from a host computer, for storing and accessing the digital data supplied by a given control signal, a control signal generating circuit connected to receive a start instruction and a start address from the exterior, for generating a control signal applied to the buffer memory, and a C3 encoding circuit connected to receive the control signal of the control signal generating circuit, for generating a parity of two symbols with respect to 44 data symbols on the basis of a DDS format.

BRIEF DESCRIPTION OF THE DRAWINGS

For a better understanding of the invention and to show how the same may be carried into effect, reference will now be made, by way of example only, to the accompanying diagrammatic drawings, in which:

FIG. 2 shows the data allocation of a main region in one frame;

DETAILED DESCRIPTION OF THE PREFERRED EMBODIMENT

Figure 1:
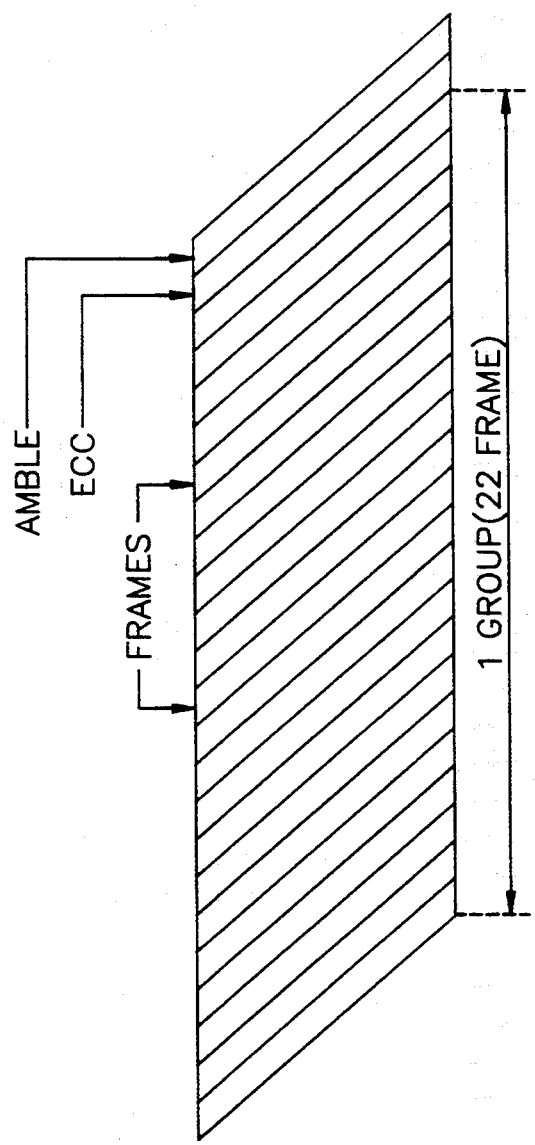
FIG. 1 shows the construction of one group in a DDS format.
Figure 3:
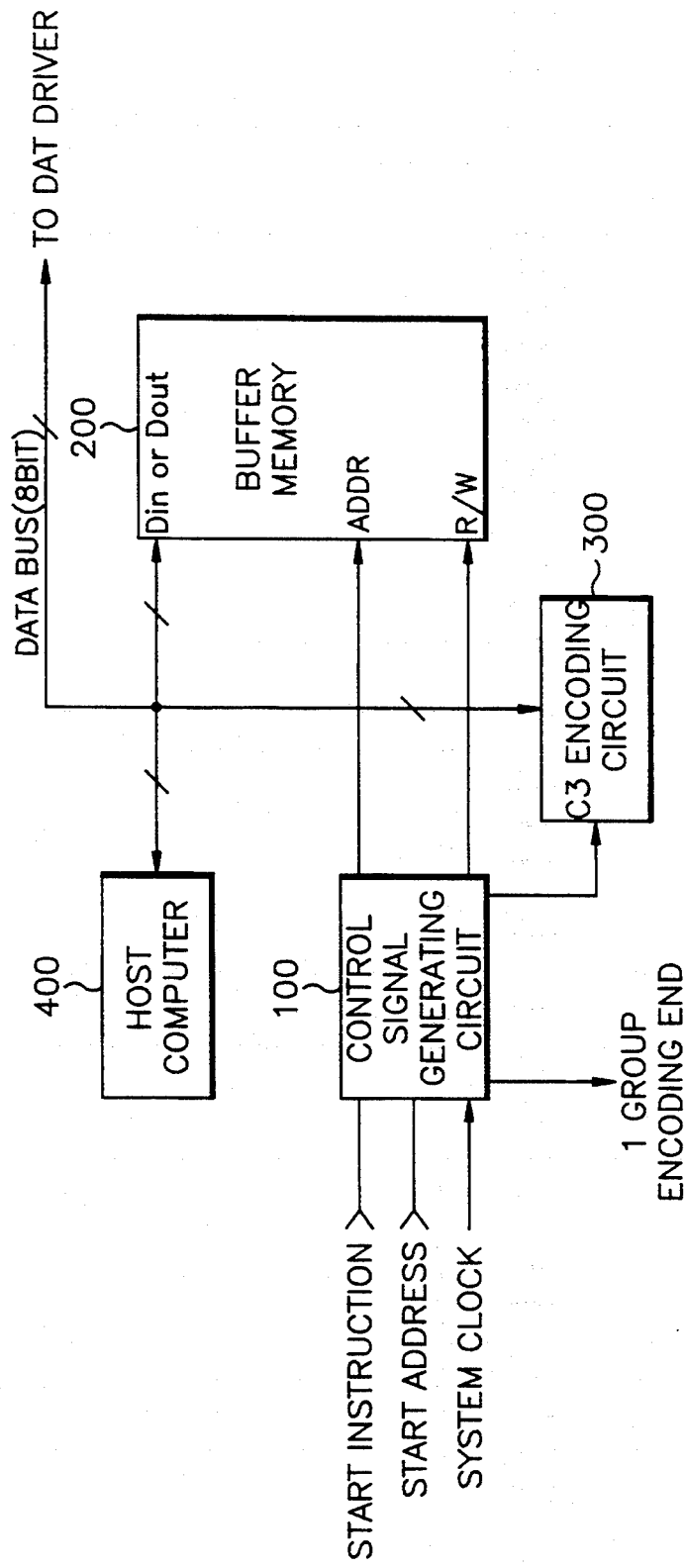
FIG. 3 is a block diagram of an addressing circuit embodying the present invention.

Referring to FIG. 3, an addressing circuit has a buffer memory 200 connected to receive digital data transmitted from a host computer 400, for storing and accessing the digital data supplied by a given control signal, a control signal generating circuit 100 connected to receive a start instruction and a start address from the exterior, for generating a control signal applied to the buffer memory 200, and a C3 encoding circuit 300 connected to receive the control signal of the control signal generating circuit 100, for generating a parity of two symbols with respect to 44 data symbols on the basis of a DDS format.

Figure 4:
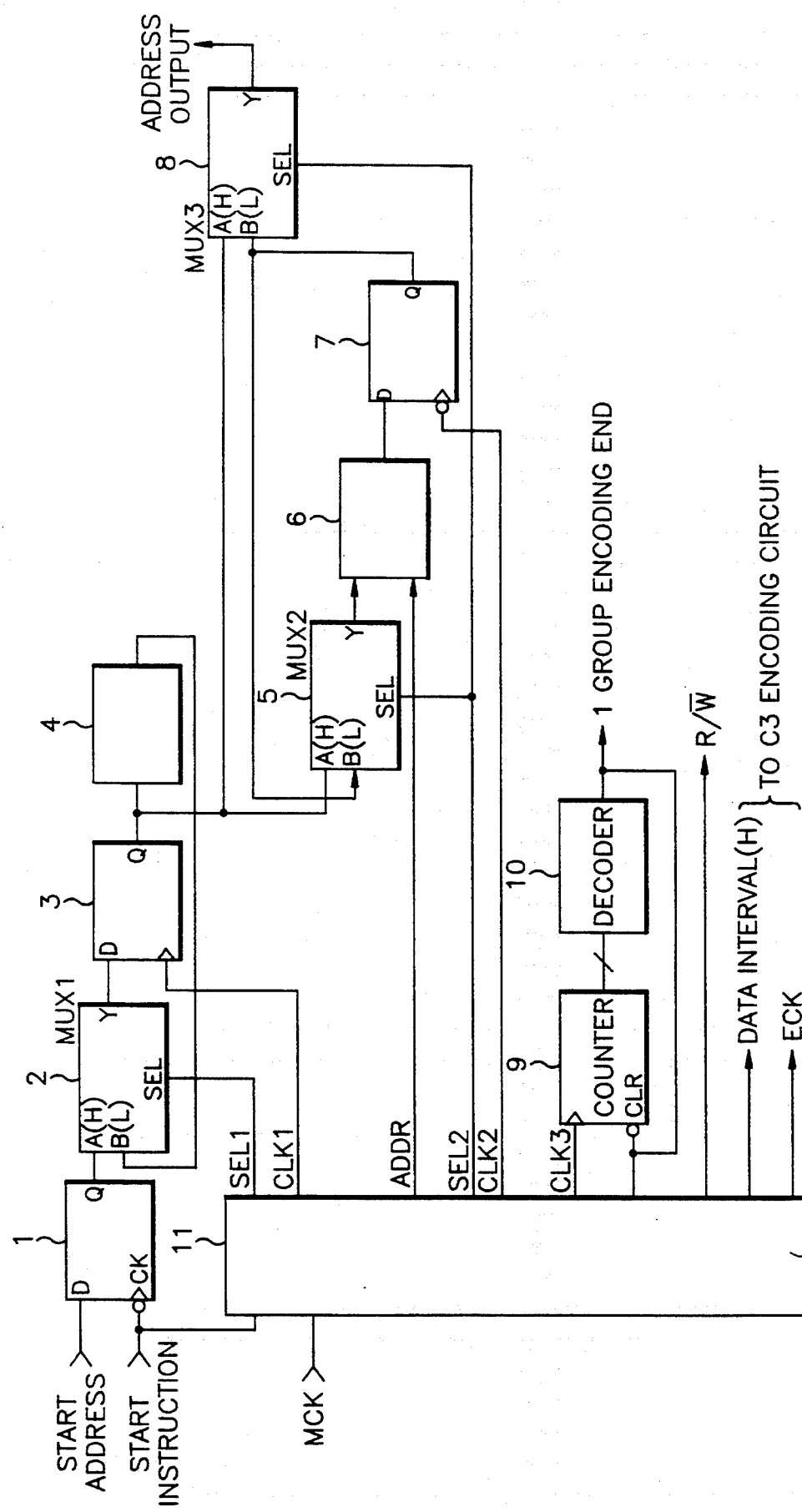
FIG. 4 is a more detailed block diagram of a control signal generating circuit of FIG. 3.

Referring to FIG. 4, there is shown a block diagram for illustrating the control signal generating circuit 100 of FIG. 3. A controller 11 connected to receive a master clock signal MCK and a start instruction generates first and second select signals SEL1 and SEL2, an addressing enable signal ADDR, first to third clock signals CLK1, CLK2 and CLK3, a read/write signal R/$\overline{W}$, a data interval signal and an encoding clock signal ECK. Highest degree term determining means including first and second D flip-flops 1 and 3, a first multiplexer 2 and an address increasing circuit 4 receives a start address and the start instruction and determines a highest degree term among 44 data by latching the start address in response to the first select signal SEL1 and the first clock signal CLK1 generated from the controller 11. Address output means having second and third multiplexers 5 and 8, an offset address adder 6 and a third D flip-flop 7 adds an offset value by the addressing enable signal ADDR generated from the controller 11 and sequentially produces an address by the second select signal SEL2 generated from the controller 11 in order to encode 43 data except the highest degree term. Furthermore, encoding end sensing means having a counter 9 and a decoder 10 receives the third clock signal CLK3 produced from the controller 11 and generates an encoding end signal of one group.

The operation of the addressing circuit embodying the present invention will now be described in detail with reference to FIGS. 3 to 6.

Figure 6:
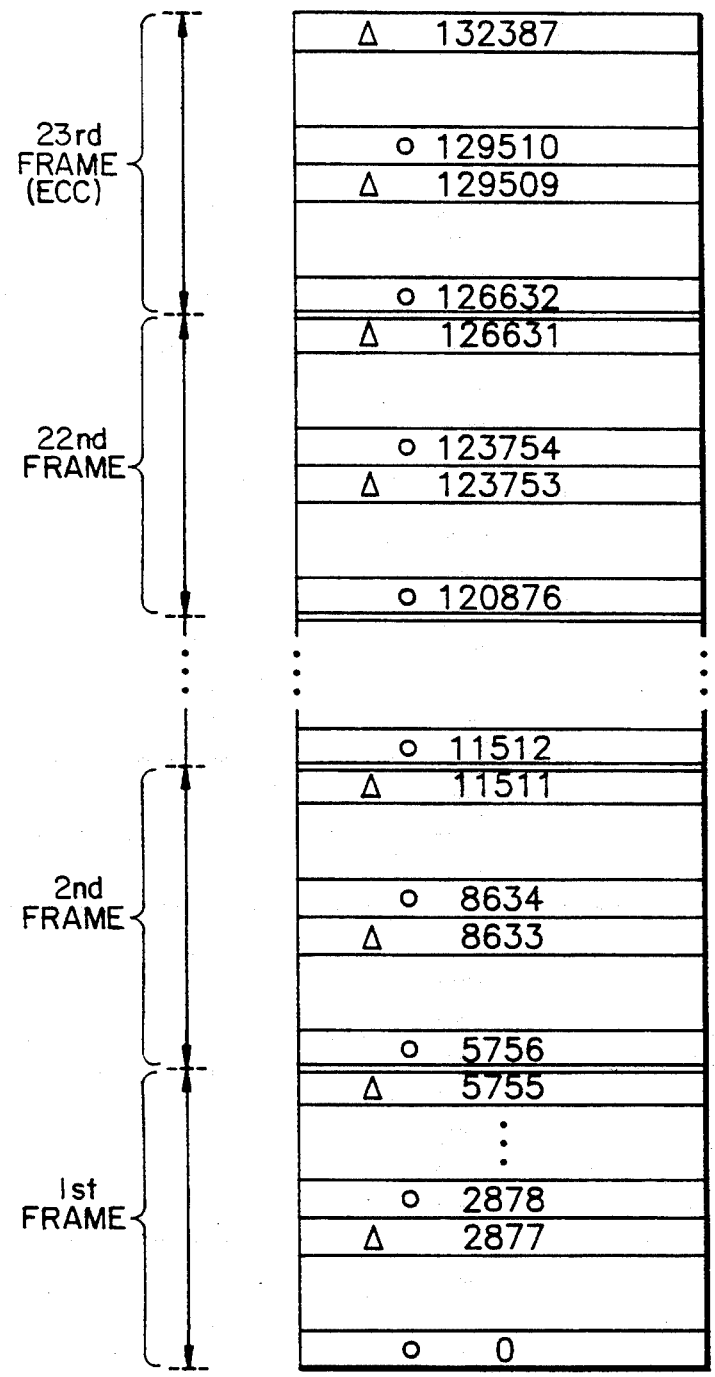
FIG. 6 shows a memory map of a buffer memory of FIG. 3.

In FIG. 3, the control signal generating circuit 100 receiving a start instruction, a start address and a system clock generates a given address, a read/write signal, a data interval signal, an encoding clock signal, and a group encoding end signal. In this case, digital data transmitted from the host computer 400 is addressed by the address and read/write signal generated from the control signal generating circuit 100 and sequentially recorded from address 0 in the buffer memory 200. The address of data written into the buffer memory 200 is fixed. That is, data corresponding to 5756 bytes of a first frame is allocated from address 0 to address 5755, and data corresponding to a second frame is written in address 5756 to address 11511. FIG. 6 shows a memory map of the buffer memory 200 of FIG. 3. If the buffer memory 200 is filled with data of one group, the C3 encoding circuit 300 receives the control signal of the control signal generating circuit 100 so as to perform a C3 encoding operation.

The main data allocation of FIG. 2 is a final format of a tape recorded through an interleaving process, and in this case, it should be noted that 44 symbols for C3 encoding does not mean 44 data, for example, from address 0 to address 43. That is, two data per frame is selected, and as a result, 44 data is selected from 22 frames. Hence, the total number of data selected from the buffer memory 200 is 44 of addresses 0, 2878, 5756, ..., 123754, and the data transmitted to the C3 encoding circuit 300 through the addresses becomes one group for C3 encoding.

Next, the operation generating the address and control signal for selecting the data will now be described with reference to FIGS. 4, 5 and 6.

Figure 5A:
FIG. 5A to 5O show operational waveforms appearing at each portion of FIG. 4.
Figure 5B:
Figure 5C:
Figure 5D:
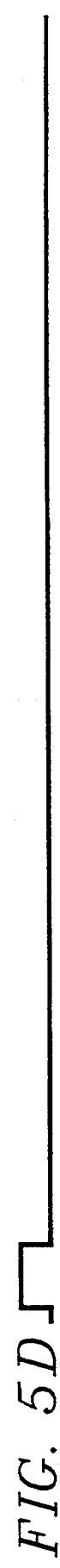
Figure 5E:
Figure 5F:
Figure 5G:
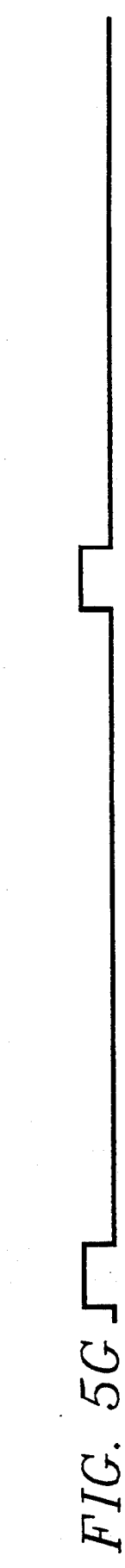

If the buffer memory 200 is filled with data of one group, a start instruction signal shown in FIG. 5B and a start address capable of starting an encoding operation are applied to the D flip-flop 1 from a MPU (Micro-Processing Unit) (not shown). In this case, it is assumed that the start address is address 0. The start address is latched onto a rising edge of the start instruction signal, and the D flip-flop 1 generates an output signal shown in FIG. 5C. The output signal of the D flip-flop 1 is maintained until a group encoding operation is ended and supplied to an input terminal A of the first multiplexer 2. At this time, the controller 11 supplies a first select signal SEL1 indicated in FIG. 5D to the select terminal SEL of the first multiplexer 2, and the first multiplexer 2 selectively produces a signal applied to the input terminal A at "high" level of the first select signal SEL1. The D flip-flop 3 with a data terminal D receiving the start address shown in FIG. 5C selectively generated from the first multiplexer 2 is latched onto a first clock signal CLK1 indicated in FIG. 5E and produces an output signal shown in FIG. 5F. An initial start address generated from the D flip-flop 3 is increased by one in the address increasing circuit 4. Furthermore, the latched start address in the D flip-flop 3 is applied to the input terminal A of the third multiplexer 8 so that the latched start address may be an initial address of the buffer memory 200, and selectively generated through the third multiplexer 8 at "high" level of a second select signal SEL2 shown in FIG. 5G. Moreover, data in address 0 of the buffer memory 200 is a highest degree term d43 among 44 data symbols necessary for one encoding operation as shown in FIG. 5L. In order to obtain the next degree term d42, the value of 2878 is added to the start address, as shown in the memory map of FIG. 6. That is, the output of the D flip-flop 3 is applied to the input terminal A of the second multiplexer 5 and selectively generated through the second multiplexer 5 at "high" level of the second select signal SEL2. Moreover, at "low" level of the second select signal SEL2, an offset value of 2878 is added to the start address in the offset adder 6.

If the addition of 2878 is performed as much as 43 times in the offset adder 6, the addressing of 44 data necessary for one encoding operation up to address 123754 in FIG. 6 is finished. Therefore, the offset value (0+2878) added once in the offset adder 6 is supplied to the data terminal D of the D flip-flop 7 and latched onto a second clock signal CLK2 shown in FIG. 5A. The latched offset value (0+2878) through the D flip-flop 7 is applied to the input terminal B of the third multiplexer 8 and selectively produced through the output terminal Y of the third multiplexer 8 by the second select signal SEL2. The output of the third multiplexer 8 is supplied to an address of the buffer memory 200 and an address of d42 among data shown in FIG. 5L is selected. In addition, the latched offset value (0+2878) through the D flip-flop is again applied to the input terminal B of the second multiplexer 5, and the above-described operation repeats 43 times. Thus, 44 data of first encoding is supplied to the C3 encoding circuit 300 and two parities are generated by the operation of a generator polynomial. In this case, the parities should be again written into addresses 126632 and 129510 of the memory map of FIG. 6. Therefore, the 43 times added offset value should be maintained during encoding. The added offset value is maintained by an addressing enable signal shown in FIG. 5K until parity data is generated after adding a 44th offset value. The 44 times added address is applied to the address of the buffer memory 200 and the parity data generated from the C3 encoding circuit 300 is written into address 26632. Thereafter, second parity data is written into address 29510 obtained by adding the offset value 2878 to address 126632. Then, the first encoding operation is ended.

If the first encoding operation is over, the addressing of 44 data symbols for second encoding is newly performed. The highest degree term d43 of second encoding data d(X) exists in address 1 of the buffer memory 200. In this case, the address 1 can be selected by the output of the address increasing circuit 4. That is, if the output of the address increasing circuit 4 is supplied to the input terminal B of the first multiplexer 2, the address 1 is produced by the first select signal SEL1. The first select signal SEL1 applied to the first multiplexer 2 is set to "high" level only for the initial start address, otherwise set to "low" level until the one group encoding is ended. The second encoding data is latched onto the first clock signal CLK1 in the D flip-flop 3 and the addressing is performed up to 2878 times by the same operating principle with the first encoding operation. That is, the addressing is repeatedly implemented until the output of the address increasing circuit 4 is 2878. If the output of the address increasing circuit 4 is 2877, the address 2877 becomes the highest degree term d43 of the data d(X) for the last 2878 th encoding of one group. Thus, the offset value 2878 is added to the address 2877 as much as 43 times and further added twice to the 43 times added address 126631. Thereafter, if 44 data of the second encoding and two parity data is written into the buffer memory 200, the encoding operation corresponding to one group is ended, and the MPU should be notified whether the encoding operation of one group is finished. Therefore, the controller 11 generates a third clock signal CLK3 shown in FIG. 50 whenever one encoding operation is over. At this time, the counter 9 counts the third clock signal CLK3 generated from the controller 11 and supplies the counted value to the decoder 10. The decoder 10 produces a signal of "low" level when the counted value is 2878, and sends a one group encoding end signal to the MPU and simultaneously clear the counter 9. If the one group encoding end signal is applied to the MPU, the MPU prepares new encoding for a next group.

As described above, when recording digital data transmitted from a computer, etc., on the basis of a DDS format, an address is controlled so as to additionally record a parity for correcting an error. Therefore, the error can be accurately corrected and the reliability and function of a system can be improved.

While preferred embodiments of the present invention have been particularly shown and described, it will be understood by those skilled in the art that foregoing and other changes in form and details may be made without departing from the spirit and scope of the present invention.

I claim:

1. An address signal generating circuit comprising:
 a buffer memory connected to receive digital data transmitted from a host computer, for storing and accessing the digital data supplied by a given control signal;
 a control signal generating circuit connected to receive a start instruction and a start address from the exterior, for generating a control signal applied to said buffer memory; and
 a C3 encoding circuit connected to receive the control signal of said control signal generating circuit, for generating a parity of two symbols with respect to 44 data symbols on the basis of a digital data storage (DDS) format.

2. The address signal generating circuit as claimed in claim 1, wherein said control signal generating circuit comprises:
 controlling means connected to receive a master clock signal and said start instruction, for generating first and second select signals, an addressing enable signal, first to third clock signals, a read/write signal, a data interval signal and an encoding clock signal;
 highest degree term determining means connected to receive said start address and the start instruction, for determining a highest degree term among 44 data by latching the start address in response to the first select signal and the first clock signal generated from said controlling means;
 address output means for adding an offset value by the addressing enable signal generated from said controlling means and sequentially producing an address by the second select signal generated from said controlling means in order to encode 43 data except for the highest degree term; and
 encoding end sensing means connected to receive the third clock signal produced from said controlling means, for generating an encoding end signal of one group.

3. The address signal generating circuit as claimed in claim 2, wherein said highest degree term determining means comprises a first flip-flop circuit having a data input for receiving the start address and a clock input for receiving the start instruction, a first multiplexer coupled to receive an output of said first flip-flop circuit, a second flip-flop circuit having a data input for receiving an output of said first multiplexer and a clock input for receiving the first clock signal, and an address increasing circuit coupled to receive an output of said second flip-flop circuit.

4. The address signal generating circuit as claimed in claim 3, wherein said address output means comprises a second multiplexer coupled to receive outputs of said second flip-flop circuit and said address increasing circuit, respectively, an offset address adder coupled to receive an output of said second multiplexer and the addressing enable signal, a third flip-flop circuit having a data input for receiving the output of said offset address adder and a clock input for receiving the second clock signal, and a third multiplexer coupled to receive an output of said third flip-flop circuit, an output of said second flip-flop circuit and said second select signal.

5. The address signal generating circuit as claimed in claim 3, wherein said encoding end sensing means comprises a counter coupled to receive the third clock signal, and a decoder coupled to receive an output of said counter.

6. An address signal generating circuit comprising:
a buffer memory receiving digital data transmitted from a host computer for storing and for accessing respective received digital data responsive to a control signal;
a control signal generating circuit receiving an applied start instruction and an applied start address for generating said control signal applied to said buffer memory; and
a C3 encoding circuit receiving said control signal for generating a parity of two symbols with respect to 44 data symbols corresponding to a digital data storage (DDS) format.

7. The address signal generating circuit as claimed in claim 6, wherein said control signal generating circuit comprises:
controlling means receiving a master clock signal and said start instruction for generating first and second select signals, an addressing enable signal, first, second and third clock signals, a read/write signal, a data interval signal and an encoding clock signal;
highest degree term determining means receiving said start address and said start instruction for determining a highest degree term among 44 data by latching the start address in response to said first select signal and said first clock signal;
address output means for adding an offset value by the addressing enable signal generated from said controlling means and for sequentially producing an address by the second select signal in order to thereby encode 43 data except for the highest degree term; and
encoding end sensing means receiving said third clock signal for generating an encoding end signal corresponding to one group.

8. The address signal generating circuit as claimed in claim 7, wherein said highest degree term determining means comprises:
a first flip-flop circuit having a data input for receiving the first flip-flop circuit having a data input for receiving the start address and a clock input for receiving the start instruction;
a first multiplexer coupled to receive an output of said first flip-flop circuit;
a second flip-flop circuit having a data input for receiving an output of said first multiplexer and a clock input for receiving the first clock signal; and
an address increasing circuit coupled to receive an output of said second flip-flop circuit.

9. The address signal generating circuit as claimed in claim 8, wherein said address output means comprises:
a second multiplexer coupled to receive outputs of said second flip-flop circuit and said address increasing circuit, respectively;
an offset address adder coupled to receive an output of said second multiplexer and the addressing enable signal;
a third flip-flop circuit having a data input for receiving the data output of said offset address adder and a clock input for receiving the second clock signal; and
a third multiplexer coupled to receive an output of said third flip-flop circuit, an output of said second flip-flop circuit and said second select signal.

10. The address signal generating circuit as claimed in claim 8, wherein said encoding end sensing means comprises:
a counter coupled to receive the third clock signal; and
a decoder coupled to receive an output of said counter.

* * * * *